Feb. 16, 1937.  E. G. BRIDGES  2,071,295
METHOD AND APPARATUS FOR THE MANUFACTURE OF HOLLOW GLASS ARTICLES
Filed Dec. 28, 1929  2 Sheets-Sheet 1

Inventor
Edward G. Bridges
By Emery, Booth, Varney & Holcombe
his Attorneys

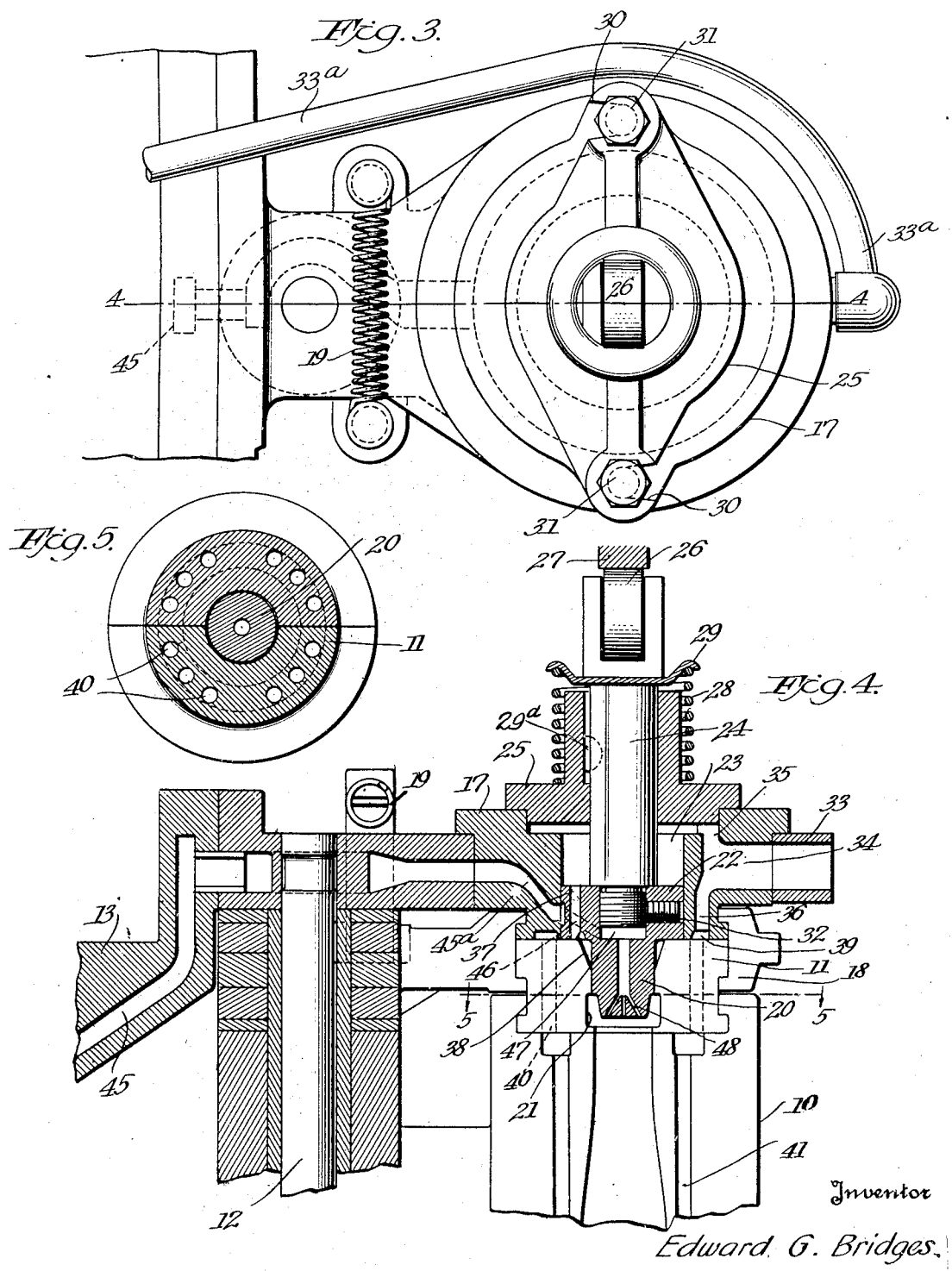

Patented Feb. 16, 1937

2,071,295

UNITED STATES PATENT OFFICE 2,071,295

METHOD AND APPARATUS FOR THE MANUFACTURE OF HOLLOW GLASS ARTICLES

Edward G. Bridges, Anderson, Ind., assignor to Lynch Corporation, a corporation of Indiana Application December 28, 1929, Serial No. 417,166

18 Claims. (Cl. 49—5)

The invention relates to improvements in the manufacture of glassware, particularly hollow glass containers, such as bottles, jars, and the like, either of the wide mouth or narrow neck variety, and aims generally to improve both the methods of and the apparatus for the manufacture of such ware.

The invention is of general applicability to existing methods and machines, including both the so-called suction or vacuum type, i. e. wherein the parison mold is dipped or brought into contact with a bath of molten glass, and suction applied to the mold to fill the mold by raising the glass therein, and the so-called "gob fed" type, i. e. wherein pre-shaped gobs or charges of glass are fed into the open end of a shaping mold, and the charge is initially compacted therein by suction or fluid pressure, or both at once applied to opposite ends of the charge. In all types of such machines it is highly desirable to apply the suction to the outer edge of the neck finish cavity of the neck mold, so as to insure completely filling the neck finish cavity, and also to apply the suction in the body portion of the parison mold to assist in the compacting operation. The latter is usually effected by providing passages cored lengthwise in the parison mold halves and connected to the suction passages leading to the neck end of the mold cavity, so that the suction effect will be applied at the sides of the body blank mold as well as the neck end thereof, to accelerate movement of the glass during the charging and compacting operation, thus insuring a more perfect neck finish on the bottle or jar.

Furthermore, in the succeeding steps of manufacture it is advisable, if not necessary, to counterblow the glass charge in the parison mold, while confined therein by a suitable bottom closure, so as to prepare a shaped parison of definite length and condition suitable for subsequent blowing to finished form in a blow or finishing mold. This step of counterblowing is usually effected by withdrawing the mouth forming pin from the neck of the parison and admitting air under pressure to the mouth end of the glass blank to blow it to a definite length and shape in the parison mold.

Difficulties have heretofore been experienced in the manufacture of hollow glassware according to the methods above described in preventing the pressure blowing air from reaching the cored longitudinal suction passages of the parison mold halves which otherwise would result in blowing the parison away from the walls of the parison mold so that proper chilling of the parison by the mold would not be effected. Prior efforts to solve this difficulty have required a blow head separate from the mold assembly and movable into cooperative engagement therewith only after complete withdrawal of the mouth forming pin or plunger, thus requiring complicated mechanism. On the other hand attempts to utilize simple unitary mechanism for the purpose have necessitated discarding the advantage of the application of suction either to the mouth finish cavity or to the body portion of the parison mold, both at once not having been attainable heretofore.

Furthermore, in many instances, it is desirable to keep the mouth forming pin in contact with the glass during the counterblowing so as to chill and set it sufficiently to perfect the finish, while not permitting the opposite end of the blank to chill to such extent that wavy bottles are produced.

To these ends, the invention aims to improve existing methods of and apparatus for manufacturing hollow glassware by applying suction to the mouth finish cavity and throughout a substantial portion of the length of the parison mold cavity so as to effect proper compacting of the glass therein and a well shaped neck finish, and by confining the admission of air under pressure to the mouth end of the glass blank exclusively, and irrespective of the termination of the suction in the body of the parison mold, or the withdrawal of the mouth forming pin. Thus, by my invention, I am able to produce by the suction method properly shaped parisons of uniform length and character, with uniformly chilled "skins" suitable for transferring to a blow mold and subsequent final blowing.

Reference is made to the accompanying drawings illustrating apparatus suitable for practicing the invention, wherein Fig. 1 is a vertical part sectional view of apparatus for gathering mold charges from a bath of molten glass and forming the charge therein into a properly shaped parison according to the invention;

Fig. 3 is a plan view of the mold assembly;

Fig. 4 is an enlarged vertical sectional view thereof taken on the line 4—4 of Fig. 3; and Fig. 5 is a horizontal sectional view through the mouthforming pin taken on the line 5—5 of Fig. 4.

Figure 1:
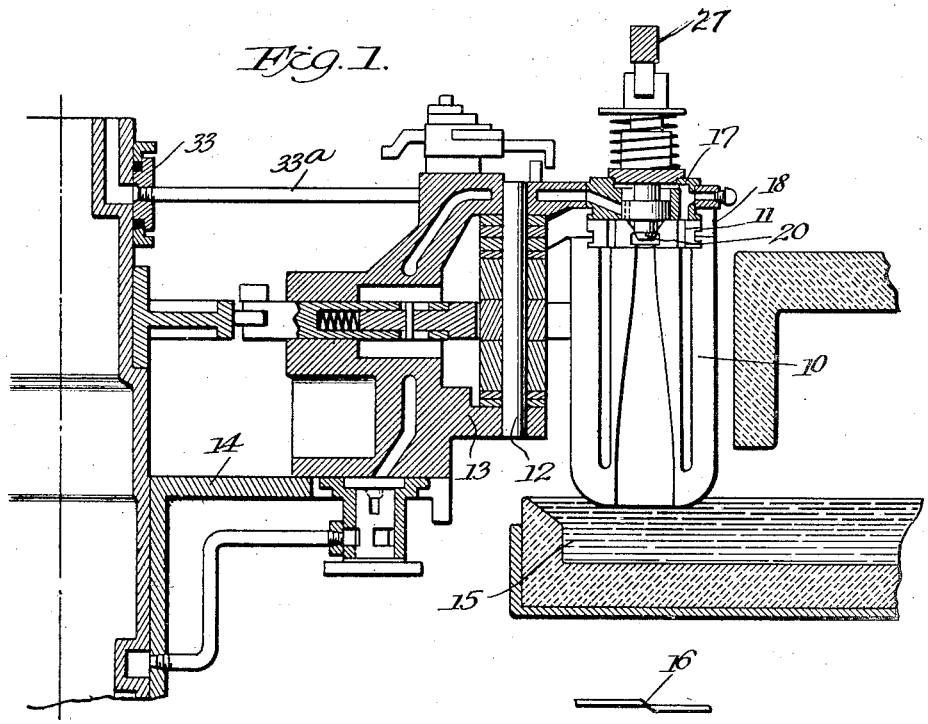
Figure 2:
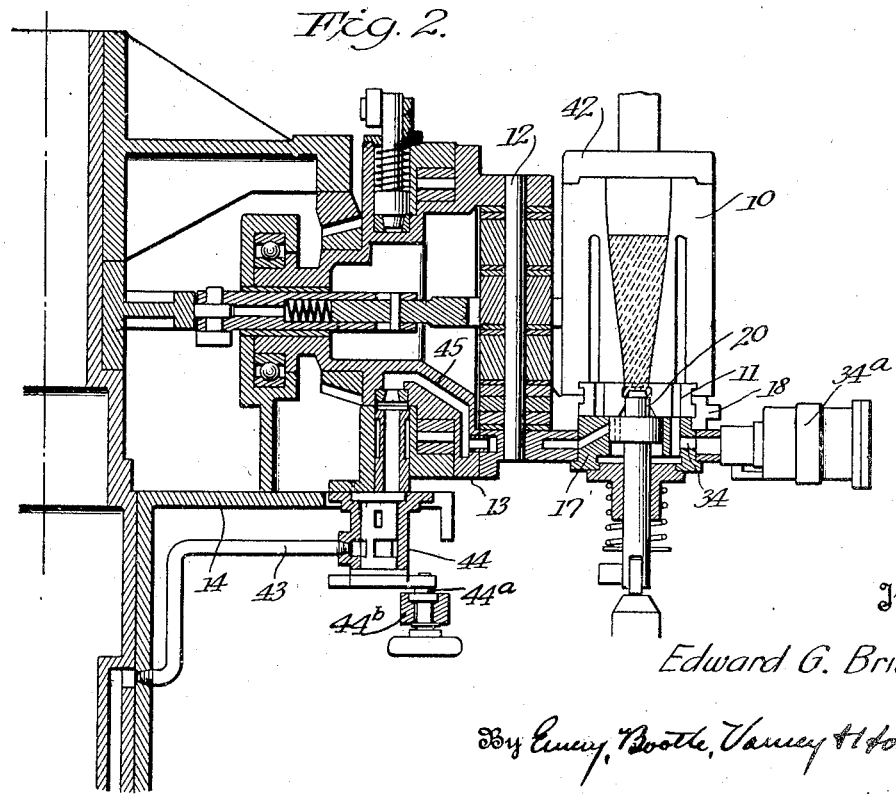
Fig. 2 is a similar view of apparatus suitable for receiving pre-shaped mold charges from a mechanical feeding device and forming the charges into properly shaped parisons according to the invention.

With reference to the illustrative embodiments of the apparatus shown in Figs. 1 and 2 the drawings have many features in common. The parison mold comprises a body blank mold 10 and a neck mold 11, each preferably being formed of sections pivoted or hinged together upon a hinge pin 12, carried by the support 13. Preferably there is a series of these parison molds mounted upon a rotatable carrier 14 so as to be moved into charging position, either over and into contact with a bath 15 of glass (Fig. 1) or under a feeding device 16 (Fig. 2) adapted to automatically deliver properly shaped mold charges to the parison molds at regular intervals, as is well understood in the art.

In the form of apparatus illustrated in Fig. 1, the molds may be moved and brought into contact with the molten glass in any approved manner, and in such machines the parison molds may be maintained permanently in upright position, that is, with their neck ends uppermost, suitable for both gathering and transferring. On the other hand, the type of machines adapted to receive "gobs" or charges from a mechanical feeding device, as shown in Fig. 2, require the molds to be presented in inverted position at the charging station, when making narrow neck bottles and jars; and as is usual in such machines, suitable means may be provided for turning the parison into upright position after charging and before the final blowing of the bottle to finished form in the blow mold.

Fixedly mounted on the parison mold support 13 and in alignment with the neck mold 11 and body blank mold 10 is a mouth forming pin box or housing 17, which preferably is held in alignment with the neck mold 11, by neck mold holders 18 embracing flanged portions of both the neck molds 11 and housing 17. These neck mold holders with their neck mold sections are advantageously held together by suitable means, as for example, springs 19 capable of yielding to permit separation of the neck molds at the proper times by any suitable means.

A mouth forming pin 20 is movably mounted in the housing 17 and has its shaping end extending into and closing the mouth end of the mouth finish cavity 21 of the neck mold when the glass charges are placed in the mold, the pin having an enlarged body or head 22 slidable in a recess 23 in the housing. The mouth forming pin 20 may be carried by a rod 24 extending through a guide 25 and carrying a roller 26 on its outer end adapted for engagement with a suitable cam 27 for moving said mouth forming pin into closed position and holding it in place within the neck mold cavity 21. A spring 28 surrounding the guide 25 and, bearing upon a plate 29 on the rod, serves to move the mouth forming pin away from its closed position in the cavity 21, and a key 29$^a$ on the rod serves to guide the rod in its reciprocations. Obviously the length of the cam 27 determines the duration of time that the pin 20 is held in its position in the neck mold cavity 21.

The mouth forming pin 20, rod 24, guide 25 and related parts are advantageously removable from and replaceable in the machine as a unit to permit of the ready interchange and replacement of mouth forming pins for the production of ware having a variety of types of mouth finishes. As shown herein, (see Figs. 3 and 4) the guide 25, carrying the rod 24, pin 20, roller 26, spring 28 and plate 29, is removably secured to housing 17 by means of slotted ears 30 on the guide 25, adapted to be positioned around threaded clamping bolts 31, which may be tightened to clamp the guide 25 securely to the housing. Release of the threaded clamping bolts permits partial rotation of the guide, so that the slots 30 are removed from the bolts 31, permitting the withdrawal of the unit and the ready replacement of another unit. Also, when the unit is removed from the housing, the mouth forming pin 20 may be readily removed from the rod 24 by releasing the set screw 32 and unscrewing the pin 20 from the threaded end of the rod.

For compacting the charge of glass around the mouth forming pin 22, either when sucking the charge into the mold, as shown in Fig. 1, or upon dropping the charge into an inverted mold, as shown in Fig. 2, suction is preferably applied in the parison mold at the outer end of the neck cavity 21 and throughout a substantial length of the body blank mold 10 to accelerate the movement of the glass charge therein and pack it around the mouth forming pin. The suction may be applied from any suitable source, for instance, as shown in Fig. 1, from a stationary radially disposed valve 33, as shown in the prior patent to Reichel No. 1,020,222, dated March 12, 1912, and led to the mold assembly through pipe 33$^a$, in the cored passage 34 of the housing 17, which has spaced outlet passages 35 and 36, or as shown in Fig. 2, suction may be applied to the passage 34 when the mold is at the charging station, by means of a fluid pressure operated suction valve 34$^a$ as shown in my copending application Ser. No. 408,890. Branch passages 35 lead to the upper part of the recess 23 of the housing, for the application of suction to the cavity 21 of the neck mold through passages 37 in the head 22 of the mouth forming pin and grooves 38 in the neck mold. The passages 36 lead to an annular groove 39 in the housing 17, which communicates through transverse passages 40 in the neck mold with passages 41 in the body blank mold 10, so that the application of suction therein will be effective in the parison mold cavity throughout a substantial portion of the length thereof, as is well understood in the art.

After the glass has been sufficiently compacted around the mouth forming pin in the parison mold to form the mouth finish of the article, it is desirable to counterblow the parison, while confined in the mold, into a hollow form of definite length, better to prepare it for final blowing, as is well understood. The glass may be confined in the parison mold during counterblowing by any suitable means, for example, the shear blade in the arrangement shown in Fig. 1 herein, as disclosed in the Bock Patent No. 852,097, dated April 30, 1907, or in the apparatus illustrated in Fig. 2, by means of a separate closure 42, normally laterally removed from the axis of the mold 10 but pivoted to swing over it to close the upper end thereof after the gob has been dropped in.

In some instances the counterblowing is effected after withdrawal of the mouth forming pin 20 from its closed position in the cavity 21 of the neck mold 11, herein provided for by means of the spring 28 acting to retract the pin 20 and rod 24 when the roller 26 has moved away from the cam 27. At this point air under pressure admitted from pipe line 43, controlled by a valve 44, carried by the table and arranged to be opened at the proper time after sufficient rotation of the mold carrier, flows through passage 45 cored in the parison mold support 13, (see Figs. 1 and 2) to the housing 17, where it is directed through passage 45ᵃ to the recess 23, and thence through grooves 38 to the mouth end of the parison. The valve 44 is advantageously operated during movement of the table 14 by engagement with pins 44ᵃ adjustably mounted on a support 44ᵇ, the adjusted positions of the pins controlling the opening and closing of the valve 44 and permitting adjustably regulating and varying the commencement and duration of counter blowing with respect to the withdrawal of the mouth forming pin or the application of suction. In its retracted position, as above described, the head 22 of the mouth forming pin, acts as a piston valve to seat against the upper face of the recess 23 to prevent the flow of pressure air from recess 23 upwardly through passages 37 to passages 35 and 36 to grooves 41 in the body blank mold, as is apparent. This prevents the application of air under pressure to the grooves 41, which would blow the side of the glass parison away from the sides of the mold, resulting in insufficient and uneven chilling of the parison, and consequent thin-walled or non-uniform articles.

In the manufacture of certain types of ware, where it is normally difficult to properly chill and set the mouth finish, the counterblowing of the parison may take place, or at least be started, while the mouth forming pin closes the neck finish cavity 21, so as to keep the glass in contact with the relatively cold metal pin and set it to a maximum extent. For this purpose the head 22 of the mouth forming pin may be formed with a lateral passage 46 communicating with the air supply passage 45ᵃ and the central recess 47 in the pin 20 for receiving the threaded end of the stem 24. Branch passages 48 in the end of the pin 20 communicate with the recess 47 for directing counterblowing pressure air to the mouth end of the parison.

The mouth forming unit is of simple, sturdy construction, well adapted to withstand usage, and readily removed for exchanging plungers. It contains a positive mechanical valve for controlling the distribution of pressure air and suction.

Advantages of my invention are its applicability to the manufacture of a wide variety of ware, requiring different treatment of the mouth finish and parison counterblowing. According to the invention the counterblowing of the parison may be readily controlled by the position of the mouth forming pin unit without the necessity of complete removal of the pin from its housing, and without sacrificing the advantages of applying suction in the neck finish cavity as well as in the body blank mold cavity. The ability to effect the counterblowing operation before withdrawal of the mouth forming pin, or before termination of the suction effect, is highly desirable in that it facilitates better setting of the glass in the mouth finish of the article and is conducive to the production of ware of exceptional quality and quantity.

I claim:

1. In the method of forming hollow glass containers in associated blank molds and neck molds and a removable mouth forming pin, the steps which consist of applying suction at the outer edge of the neck finish groove of the neck mold and in the blank mold through a substantial portion of the length thereof to draw the glass into the blank and neck molds and to form the mouth finish thereof around the mouth forming pin, and in counterblowing the glass in the blank mold while confined therein by the admission of air under pressure exclusively to the mouth end of the blank while the mouth forming pin closes the mouth end thereof.

2. In the method of forming hollow glass containers in associated blank and neck molds and a cooperating mouth forming pin adapted to close the neck end of the mold, the steps which consist of applying suction simultaneously at the outer edge of the neck finish grooves of the neck mold axially of the neck mold and in the blank mold cavity throughout a substantial portion of the length thereof to draw the glass into the mold to compact it in the neck mold around the mouth forming pin and thereby form the mouth finish thereof, and in admitting air to the mouth end of the glass blank to blow it to hollow form while confined in the blank mold and while maintaining suction applied in the blank mold.

3. The method as defined in claim 2 characterized by variably controlling the starting and duration of the blowing operation independently to the termination of the application of suction to the blank mold.

4. The method as defined in claim 2 characterized by variably controlling the starting and duration of the blowing operation independently of the withdrawal of the mouth forming pin.

5. The method as defined in claim 2 characterized by variably controlling the starting and duration of the blowing operation independently to the termination of the application of suction to the blank mold and the withdrawal of the mouth forming pin.

6. Glassware forming apparatus including a sectional blank mold, a cooperating neck mold associated therewith and having a neck finish groove formed therein and a mouth forming pin adapted to be moved relatively to the neck mold and to close the mouth opening of the neck finish groove when the glass charge is placed in the mold, means for applying suction to the outer mouth finish edge of the neck finish groove axially of the neck mold and laterally along the blank mold cavity throughout a substantial length thereof to draw the glass charge in the mold and compact it in the neck mold around the mouth forming pin to form the mouth end of the article, means to withdraw the mouth forming pin from operative association with the neck mold, and means to admit air under pressure to the mouth end of the glass blank to blow it to hollow form in the blank mold prior to the termination of the application of suction.

7. Glassware forming apparatus including a sectional blank mold, a cooperating neck mold associated therewith and having a neck finish groove formed therein, and a mouth forming pin adapted to be moved relatively to the neck mold and to close the mouth opening of the neck finish groove when the glass charge is placed in the mold, means for applying suction to the outer edge of the neck finish groove and laterally along the blank mold cavity throughout a substantial length thereof to draw the glass charge into the mold and compact it in the neck mold around the mouth forming pin to form the mouth end of the article, means to withdraw the mouth forming pin from operative association with the neck mold, and means to admit air under pressure to the mouth end of the glass blank to blow it to hollow form in the blank mold prior to the withdrawal of said mouth forming pin.

8. Glassware forming apparatus including a sectional blank mold, a cooperating neck mold associated therewith and having a neck finish groove formed therein, and a mouth forming pin adapted to be moved relatively to the neck mold and to close the mouth opening of the neck finish groove when the glass charge is placed in the mold means to present said blank and neck mold in neck lowermost position to receive a charge of glass, means for applying suction to the outer mouth finish edge of the neck finish groove axially of the neck mold and laterally along the blank mold cavity throughout a substantial length thereof to draw the glass charge into the mold and compact it in the neck mold around the mouth forming pin to form the mouth end of the article, means to withdraw the mouth forming pin from operative association with the neck mold, and means to admit air under pressure to the mouth end of the glass blank to blow it to hollow form in the blank mold while preventing entrance of pressure air laterally in the blank mold during the blowing of the parison to hollow form.

9. Glassware forming apparatus including a parison mold comprising pivoted body blank mold sections and pivoted neck mold sections associated therewith and formed with a recess for shaping the mouth of the article, a rotatable mounting for said parison mold and neck mold to present said molds in inverted charging position and subsequent upright position, a mouth forming pin adapted normally to close the mouth end of said recess when the glass charge is placed in said parison mold, a housing for said mouth forming pin, a suction passage in said housing, cooperating passages in said neck mold and body blank mold for applying suction axially to the outer mouth finish edge of the neck finish recess and laterally in the cavity of the body blank mold throughout a substantial length thereof, and a separate air passage in said housing for admitting air under pressure, to the mouth end of the glass blank to blow it to hollow form in the parison mold, and means to exclude air under pressure to the body of the blank mold cavity during the blowing of the glass to hollow form.

10. Glassware forming apparatus including a parison mold comprising separable body blank mold sections, separable neck mold sections associated therewith and formed with a recess for shaping the mouth of the article, a mouth forming pin adapted normally to close the mouth end of said recess when the glass charge is placed in said parison mold, a housing for said mouth forming pin having an enlarged recess in which said pin is movable, suction passages in said housing leading to said recess and through the body blank and neck molds for applying suction axially to the outer mouth finish edge of the mouth finish recess and laterally through a substantial portion of the cavity of the body blank mold, a separate pressure air passage in said housing communicating with said recess, means separate from said suction passages for conducting pressure air to the mouth end of said glass blank, and means for excluding air under pressure from said suction passages leading through the body blank and neck molds during the application of pressure air to the mouth end of the glass blank.

11. Glassware forming apparatus including a parison mold comprising separable body blank mold sections, separable neck mold sections associated therewith and formed with a recess for shaping the mouth of the article, a mouth forming pin adapted normally to close the mouth end of said recess when the glass charge is placed in said parison mold, a housing for said mouth forming pin having an enlarged recess in which said pin is movable, suction passages in said housing leading to said recess and through the body blank and neck molds for applying suction to the outer edge of the mouth finish recess and the body blank mold, a separate pressure air passage in said housing communicating with said recess and means separate from said suction passages for conducting pressure air to the mouth end of said glass blank while the mouth forming pin closes the mouth opening of the mouth finish recess.

12. Glassware forming apparatus including an invertible parison mold comprising pivoted body blank mold sections, pivoted neck mold sections associated therewith and formed with a recess for shaping the mouth of the article, a mouth forming pin adapted normally to close the mouth end of said recess when the glass charge is placed in said parison mold, a housing for said mouth forming pin having an enlarged recess in which said pin is movable, suction passages in said housing leading to said recess and through the body blank and neck molds for applying suction to the outer mouth finish edge of the mouth finish recess axially of the neck mold cavity and laterally along the body blank mold, a separate pressure air passage in said housing communicating with said recess, and means for conducting pressure air to the mouth end of said glass blank to the exclusion of the suction passages leading through the body blank and neck molds after the mouth forming pin has been withdrawn from the mouth finish recess.

13. Glassware forming apparatus comprising cooperating blank and neck molds, a mouth forming pin adapted to close the mouth cavity of the neck mold, a casing for said mouth forming pin formed with a cylindrical recess therein, means for applying suction and supplying air pressure to said recess, means communicating with said recess for applying suction axially in the neck finish cavity of the neck mold and laterally in the cavity of the blank mold, means for withdrawing said plunger into said recess, and means controlled by the position of the plunger when withdrawn to direct air under pressure from said recess to the neck mold cavity and to exclude it from the blank mold cavity.

14. Glassware forming apparatus comprising cooperating blank and neck molds, a mouth forming pin adapted to close the mouth cavity of the neck mold, a casing for said mouth forming pin formed with a cylindrical recess therein, means for applying suction and supplying air pressure to said recess, means communicating with said recess for applying suction to the neck finish cavity of the neck mold and the cavity of the blank mold, said mouth forming pin being provided with a head for cooperation with said recess for controlling the application of suction to the neck finish cavity and blank mold cavity to cut it off when not in its operative position, and for controlling the application of air under pressure to admit it to the neck finish cavity to exclude it from the blank mold cavity when in its operative position.

15. Glassware forming apparatus comprising a parison mold, a neck mold, and a cooperating mouth forming pin, a housing in which said mouth forming pin is movable from a position close by the neck mold cavity to a position withdrawn therefrom, a combined suction and air pressure chamber in said housing, means for alternately supplying suction and air pressure to said chamber, and means controlled by the pin when closing the neck mold cavity for applying suction to said cavity and to the parison mold cavity, to compact the charges therein around the mouth forming pin, and means controlled by the position of the pin when withdrawn from the neck mold cavity for admitting air pressure from said chamber to the neck mold cavity, and preventing application of air pressure to said parison mold cavity.

16. Glassware forming apparatus comprising a parison mold, a cooperating neck mold and a mouth forming pin, adapted to close the neck mold cavity when the glass charge is packed therein, a housing associated with the neck mold and forming a guide for said mouth forming pin to permit its movement to closed and withdrawn positions with respect to said neck mold, a combined pressure and suction chamber in said housing, a series of suction ports for establishing communication between said chamber, neck mold and parison mold cavities, a series of pressure ports for establishing communication between said chamber and neck mold cavity, and means controlled by the position of the mouth pin for preventing the application of pressure air in said suction ports of the parison mold.

17. The method of forming hollow glass containers in associated blank and neck molds and a cooperating mouth forming pin, which consists in delivering a charge of glass to an inverted blank mold and applying suction simultaneously at the outer mouth finish edge of the neck finish grooves of the neck mold axially of the neck mold and in the blank mold throughout a substantial portion of the length thereof to draw the glass into the mold to compact it in the neck mold and to form the mouth finish of the article around the mouth forming pin, and then counterblowing the glass in the blank mold to a definite length and shape by the admission of air under pressure exclusively to the mouth end of said glass blank.

18. The method of forming hollow glass containers in associated blank and neck molds and a cooperating mouth forming pin, which consists in delivering a charge of glass to an inverted blank mold and applying suction simultaneously as the glass charge enters said mold at the outer mouth finish edge of the neck finish grooves of the neck mold axially of the neck mold and laterally in the blank mold throughout a substantial portion of the length thereof, thereafter closing the open end of the blank mold and admitting air under pressure to the mouth end of the glass blank exclusive of the body portion of the blank mold to expand the glass blank into a parison into a uniformly shaped and chilled parison.

EDWARD G. BRIDGES.